United States Patent [19]

Law

[11] Patent Number: 5,204,991

[45] Date of Patent: Apr. 20, 1993

[54] AUTOMOTIVE ON/OFF CIRCUIT FOR AUTOMATIC CONTROL OF THE POWER SUPPLY TO ELECTRIC AUTOMOTIVE ACCESSORIES

[76] Inventor: Ignace K. Law, P.O. Box 6803, Alhambra, Calif. 91802

[21] Appl. No.: 734,238

[22] Filed: Jul. 22, 1991

[51] Int. Cl.$^5$ .............................. B60L 1/00; H02H 7/18
[52] U.S. Cl. ..................................... 307/10.7; 307/117
[58] Field of Search ................. 123/146.5 D; 307/9.1, 307/10.1, 10.7, 116, 117; 320/13, 29, 30, 40; 322/8; 340/438, 679, 683; 361/57, 92, 104, 55; 364/424.05, 431.08, 431.09

[56] References Cited

U.S. PATENT DOCUMENTS

| | | | |
|---|---|---|---|
| 4,354,217 | 10/1982 | Mahon ............................... | 361/104 |
| 4,733,100 | 3/1988 | Nusairat et al. ..................... | 307/9.1 |
| 4,950,913 | 8/1990 | Kephart .............................. | 307/10.7 |
| 4,977,476 | 12/1990 | Marshall et al. ..................... | 361/18 |
| 5,073,721 | 12/1991 | Terrill et al. ........................ | 307/10.7 |

Primary Examiner—A. D. Pellinen
Assistant Examiner—David Osborn
Attorney, Agent, or Firm—Gilbert Kivenson

[57] ABSTRACT

An on/off circuit is provided to automatically turn "on" or "off" electrical power to electrical outlets depending upon whether an automobile engine is "on" or "off". The circuit is powered by the automobile battery via a plug inserted into an automobile cigarette lighter socket. The circuit includes a mechanical vibration sensor, namely a piezoelectrical transducer, that monitors engine vibrations. Upon detection of vibrations, the sensor outputs a signal that is amplified by an operational amplifier before being rectified and filtered into a signal that triggers a transistor to switch a power supply circuit "on". Energization of the power supply circuit provides power to one or more electrical sockets. The power supply circuit includes a current limiting circuit (featuring a Darlington transistor) to protect against high current damage. When the sensor notes an absence of vibrations, the on/off circuit shuts off the power supply circuit.

2 Claims, 2 Drawing Sheets

AUTOMOTIVE ON/OFF CIRCUIT FOR AUTOMATIC CONTROL OF THE POWER SUPPLY TO ELECTRIC AUTOMOTIVE ACCESSORIES

BACKGROUND OF THE INVENTION

This invention relates generally to an automatic on/off circuit for controlling the power supply to electrical equipment. More particularly, this invention relates to an automotive on/off circuit designed to automatically interrupt the power supply to electric automotive accessories, such as radios, cassette players, etc., in a timely manner in order to prevent such accessories from draining power from the automobile battery when the engine is not running.

There are a variety of different electrical accessories adapted for use in an automobile, truck or other craft having an accessible electrical power supply. These accessories are designed to receive power for their operation from the battery of the vehicle by being plugged into the cigarette lighter plug commonly provided in autos, trucks, etc. Besides the aforementioned radios and cassette players, other popular electrical accessories adapted for vehicular use include radar warning receivers, alarm systems, electric fans, electric shavers and the like. Typically, an accessory such as a cassette player or radar warning device is stabilized against undesirable movement while the vehicle travels by mounting the accessory upon the dash of the vehicle or, for example in the case of an electric fan, upon an interior mirror. Commonly, an electrical unit that regularly remains in place and in service within a vehicle is left plugged into the cigarette lighter plug, especially if the vehicle owner is a non-smoker. This practice creates the potential for an unwelcome energy drain upon the vehicle battery because in most automobiles and many other vehicles, the electrical power of the battery, typically twelve volts, is applied constantly to the cigarette lighter plug whether the vehicle's engine is running or turned off. Therefore, the operator must remember to manually turn off the electrical accessory whenever turning off the vehicle engine. Otherwise, the electrical unit plugged into the cigarette lighter plug will stay turned on, thereby causing the vehicle battery to run down and eventually lose its change.

Consequently, a need arose for automatic on/off circuits designed to turn off power to an electrical accessory irregardless of whether or not the operator remembers to manually turn off the accessory. One prior type of approach towards providing such an automatic on/off circuit is exemplified by U.S. Pat. No. 4,733,100, wherein execution of an electrical shutoff is tied to the elapse of a predetermined time period. This type of approach can readily be seen as less than ideal because it is preferable that power flow from the battery be shutoff instantaneously (i.e. simultaneously with the engine shutoff), rather than after expiration of a time period, in order to avoid any unnecessary power drain upon the battery. Moreover, prior approaches disadvantageously monitor whether or not the engine is running in a less than foolproof manner, thereby creating the possibility that the prior on/off circuit may inadvertently elect to bypass a necessary shutoff and continue to allow a power flow to an electrical accessory based on an inaccurate monitoring of the state of the engine. For example, the monitoring approach employed in prior U.S. Pat. No. 4,733,100 utilizes noise sensing apparatus to detect engine ignition noise that signifies a running engine. When the engine is off, the noise sensor detects the absence of engine noise and, after a predetermined time delay, effects a power shutoff. To further clarify this prior approach, it must be noted that the engine "noise" being monitored is not the audible roar of an energized motor, but rather is electrical "noise", specifically the detectable varying electrical noise signal (i.e. ignition noise) that is superimposed upon a nonvarying electrical input signal from the battery when the engine is on. Such an arrangement can give rise to problems because other sources of electrical noise in the automobile electrical system exist, especially if electrical units such as cassette players, buzzers, etc. are tied into the electrical system. Disadvantageously, these other sources may output electrical "noise" which may be detected by "noise" sensors employed in prior approaches, thereby confusing the prior monitoring process into detecting that the engine is on (because of the presence of electrical noise) when actually the engine is off, the battery is being drained, and the detected electrical "noise" is emanating from an alternate source, such as a radio left on at an inaudible volume. This nightmare scenario could result in a dead battery.

From the foregoing, it will be apparent that a significant need exists for an improved automatic on/off circuit adapted to shut off the power flow from a vehicle battery in a manner preventing any unnecessary discharge of the battery's energy. Additionally, an improved automatic on/off circuit is needed which effects instantaneous power shutoff (i.e. deactivation of the electrical system simultaneously with engine shutoff) rather than time delayed deactivation. Moreover, such an improved automatic on/off circuit should monitor the on/off state of the vehicle engine in a manner wherein the improved circuit provides accurate monitoring by eliminating the potential for anything other than the engine to be detected as evidence of a running motor. The present invention fulfills these needs in a relatively inexpensive fashion and provides further related advantages.

BRIEF DESCRIPTION OF THE DRAWINGS

The accompanying drawings illustrate the invention. In such drawings.

SUMMARY OF THE INVENTION

The present invention provides an automatic on/off circuit that will supply power from the automobile battery to electrical accessories when the automobile motor is running, but will prevent those accessories from draining battery power while the motor is off by automatically shutting off power once motor vibrations cease. The electrical circuit of the invention, which is primarily intended for use in conjunction with a cigarette lighter socket in an automobile, could also be used in other applications where a battery is employed in conjunction with an engine.

The on/off circuit includes a mechanical vibration sensor, comprising a piezoelectrical transducer, that monitors the presence or absence of mechanical vibrations emanating from the engine of a vehicle. The on/off circuit functions to automatically turn on the power supply to electrical outlets when the mechanical vibration sensor detects a running engine from the vibrations indicative thereof. Conversely, the on/off circuit also automatically turns off the power supply whenever the mechanical vibration sensor detects an absence of vibrations (indicating the engine is "off"). Additionally, a bypass or override switch is provided in the on/off circuit so that a user can manually turn on the power supply from the battery when the engine is off.

The mechanical vibration sensor emits signal whenever mechanical vibrations are sensed. This signal is amplified by an op-amp arrangement, then is rectified by a doubling rectifier, before finally being filtered a steady DC signal by a filtering network. This signal will turn "on" or "off" an on/off switch provided by a The on/off switch will activate a power supply circuit when switched "on".

This power supply circuit energizes one or more electrical outlets associated therewith, when switched "on" by the on/off switch. The outlets allow one or more electrical accessories, such as a radar warning device or cassette tape player, to be used within the cockpit of the vehicle. One need not worry about accidentally leaving an electrical accessory turned "on" because, once the vehicle motor has been shut off, the on/off circuit will automatically turn off power to the electrical outlets so that any accessory associated therewith will not drain the vehicle battery, even if said accessory remains turned "on". The present invention also includes a current limiting circuit within the power supply circuit, in order to prevent any high current heat damage from occurring. Moreover, an electrical noise filter is also provided in the power supply circuit.

Other features and advantages of the present invention will become more apparent from the following more detailed description, taken in conjunction with the accompanying drawings, which illustrate, by way of example, the principles of the invention.

DETAILED DESCRIPTION OF THE PREFERRED EMBODIMENT

Figure 1:
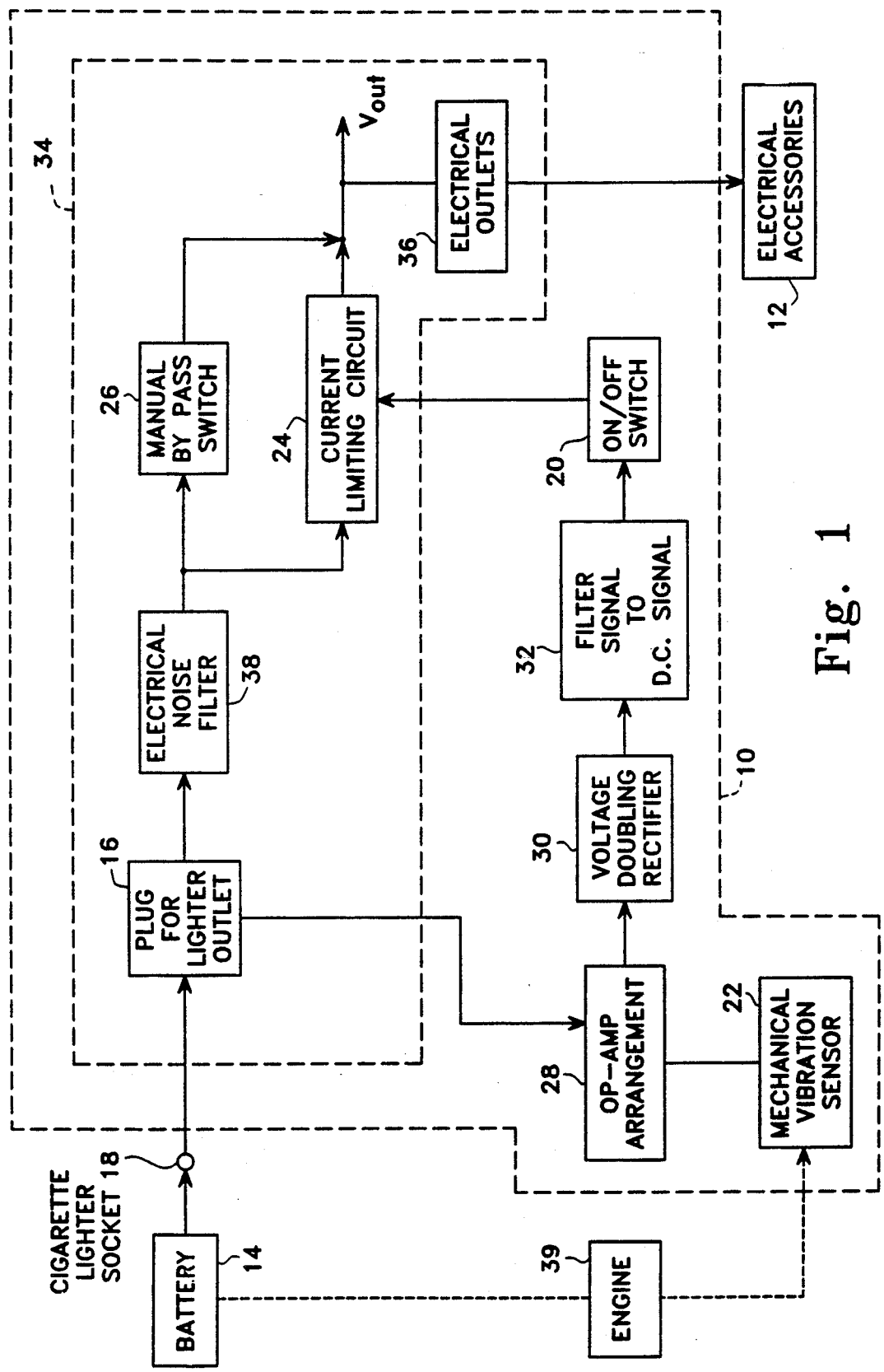
FIG. 1 is a block diagram of an automotive on/off circuit of the present invention shown connected to an automobile battery via a cigarette lighter outlet and to an electrical accessory, such as a cassette tape player.
Figure 2:
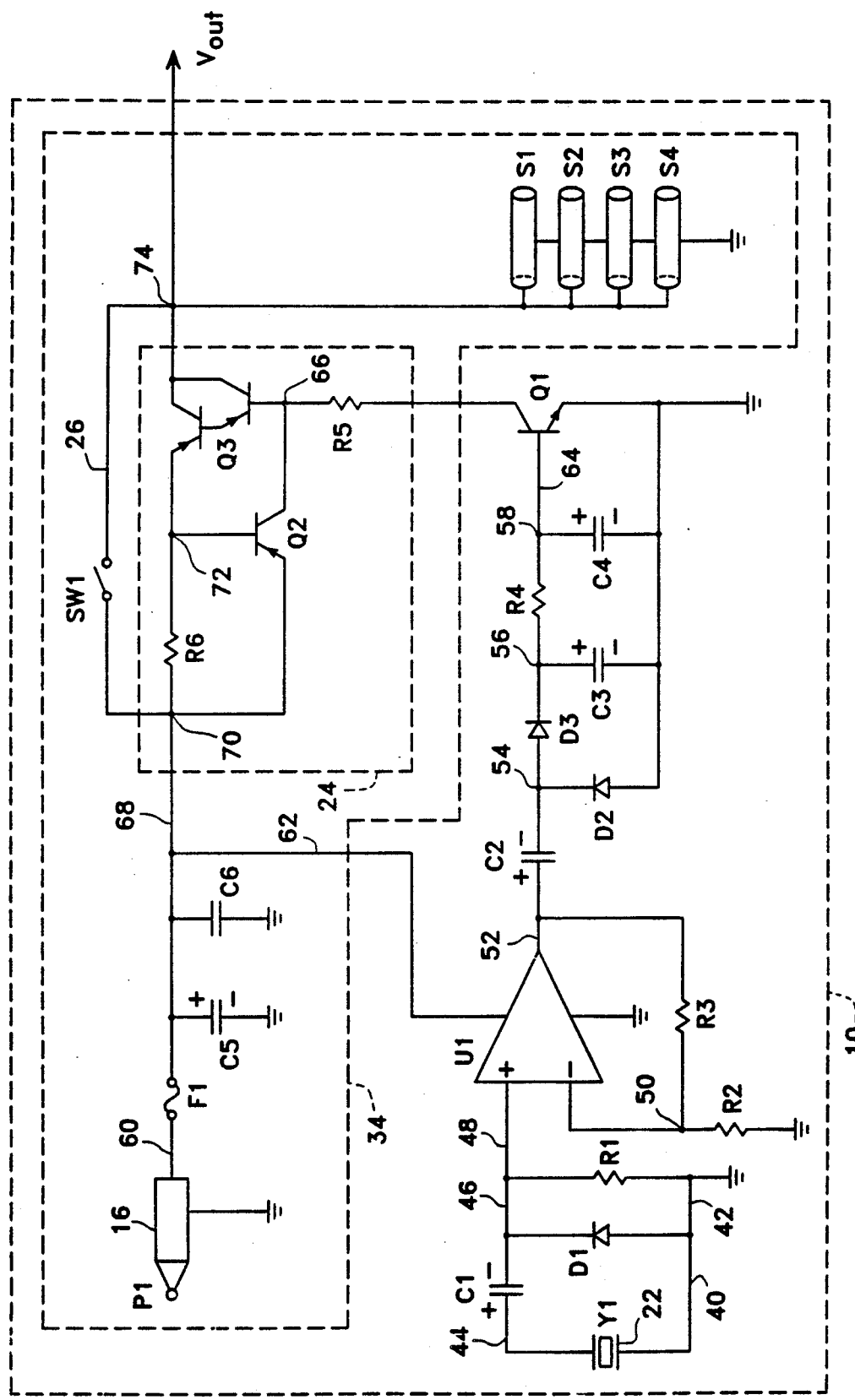
FIG. 2 is a schematic circuit diagram of the on/off circuit embodying the invention, illustrating in detail the makeup of the components of the circuit.

The automotive on/off circuit for auto control of the power supply from the battery of a motor to electrical accessories adapted for use in vehicles having an electrical system, is shown in FIG. 2. This circuit disclosed herein with reference to its utility within an or truck, however, it must be noted that the use of on/off circuit of the present invention is not 1 to use within wheeled vehicles, but rather, has utility also in boats, planes and other motorized vehicles having an electrical system. In accordance with the present invent FIG. 1 show in block diagram form an automatic on/off circuit 10 electrically connected between one or more electrical accessories 12, such as a cassette tape player, radar warning receiver, fan or the like, and an electrical power source, such as an automobile battery 14, via a plug 16 (also labeled P1 in FIG. 2) inserted into a cigarette lighter socket 18 and electrically associated therewith. Referring to both FIGS. 1 and 2, the on/off circuit 10 basically includes an on/off switch 20, a mechanical vibration sensor 22, a current limiting circuit 24, and a manual bypass switch 26. Signal output from the mechanical vibration sensor 22 is preferably electrically directed through an op-amp arrangement 28, a voltage doubling rectifier 30, and filter 32 before said signal will turn the on/off switch 20 either "off" or "on". In the latter case, a power supply circuit 34 will be energized such that electrical power will be provided to electrical outlets 36 (and electrical accessories 12 plugged into said outlets). The on/off circuit 10 may also include an electrical noise filter 38.

The inventive on/off circuit 10 monitors the presence or absence of mechanical vibrations in the vehicle within which said circuit is employed. For example, when used in an automobile, the engine 39 of the vehicle will generate mechanical vibrations that will propagate over the entire automobile body. These vibrations are detected by the mechanical vibration sensor 22 which comprises at least one piezoelectrical transducer Y1. Transducer Y1 may be firmly attached to the automobile body frame in any conventional manner in order to sense vibrations most effectively. Alternatively, in the preferred embodiment set forth herein, a transducer Y1 having high sensitivity and an operational amplifier (op-amp) U1 associated therewith will function as needed to sense vibrations while being incorporated into a stylish case (not shown; of any conventional design) that also will house one or more electric socket or outlets 36. Provision of the transducer Y1 in a portable case (that also houses the other components described herein) will advantageously simplify the installation procedure to an easy process of merely plugging the plug 16 (P1) into a vehicle's cigarette lighter socket 18. The transducer Y1 is electrically connected between ground (via leads 40 and 42) and the non-inverting input of the op-amp U1 (via leads 44, 46 and 48). Whenever the transducer Y1 detects mechanical vibration, it outputs an alternating current (AC) electrical signal to the op-amp U1. This AC electrical signal is coup to the non-inverting input of the op-amp U1 through a C1. Capacitor C1 is electrically connected between the transducer Y1 and the non-inverting input of the op-amp U1.

U1 (via leads 46 and 48). More specifically, in regard to its association with the op-amp U1, the diode D1 is electrically connected between the capacitor C1 and the non-inverting input of the op-amp U1. The diode D1 provides means for protecting the op-amp U1 by preventing the voltage at the non-inverting input pin from falling lower than a predetermined minimum. In the preferred embodiment described herein, the diode D1 protects the non-inverting input pin of the op-amp U1 by preventing the voltage at this input pin from falling below $-0.3$ V. A resistor R1 is connected between ground and the op-amp U1. More specifically, in regard to its association with the op-amp U1, the resistor R1 is electrically connected between the diode D1 and the non-inverting input of said op-amp. The resistor R1 is used as the load of the transducer Y1.

In addition to the op-amp U1, the op-amp arrangement 28 includes a resistor R3 connected in feedback relation between the output and the inverting input of the op-amp U1. The op-amp arrangement 28 also includes a resistor R2 that is connected between ground and a summing junction 50. At the summing junction 50, the resistor R2 is connected with the feedback resistor R3 and the inverting input of the op-amp U1. The gain of the op-amp U1 is the ratio of resistor R3 over resistor R2 (R3/R2). Preferably, the feedback resistor R3 has a value substantially greater than that of the resistor R2 so that the output of the op-amp U1 is amplified accordingly. In this preferred version, the ratio of R3/R2 is selected to provide a gain of 100,000. The fidelity of the op-amp U1 is not crucial, however the amplitude of an amplified AC signal outputted by the op-amp U1 must be sufficient to drive the rest of the on/off circuit 10 to be described hereinafter. The op-amp U1 is also grounded and is electrically connected to the battery 14 via the plug 16 and leads 60 and 62.

A capacitor C2 is interposed in an output lead 52 of the op-amp U1, between said op-amp and the voltage doubling rectifier 30. The voltage doubling rectifier 30 comprises diodes D2 and D3. Diode D2 is connected between ground and a junction 54, whereat diodes D2 and D3 and capacitor C2 are all connected. The junction 54 lies along the output lead 52 of the op-amp U1. The diode D3 is connected between capacitor C2 and diode D2, and is interposed in the output lead 52 between the op-amp U1 and the filtering network 32.

An amplified AC signal outputted by the op-amp U1 is rectified by the diodes D2 and D3 and then the rectified signal is filtered into a steady DC signal by the filtering network 32 which comprises two capacitors C3 and C4 in parallel with a resistor R4 connected between said capacitors. The resistor R4 is connected between a junction 56, whereat the diode D3 and the capacitor C3 are also connected, and a junction 58, whereat the capacitor C4 and the base of a transistor Q1 are also connected. The capacitor C3 is connected between the diode D3 and the resistor R4, and to ground. The capacitor C4 is connected between the resistor R4 and the base of the transistor Q1, and to ground. The signal input to the base of the transistor Q1 is a signal which has been outputted (and amplified) by the op-amp U1, and then processed into a steady DC signal by the voltage doubling rectifier 30 and the filtering network 32.

The transistor Q1 serves as the on/off switch 20. When no mechanical vibrations are sensed by the transducer Y1, no signal will be outputted by said transducer, and the transistor Q1 will remain in a nonconducting or "off" state. When mechanical vibrations are detected by the transducer Y1, the signal outputted therefrom will ultimately (following amplification, rectification and filtration) switch and hold the transistor Q1 to a conducting or "on" state, thereby activating the power supply circuit 34 and supplying electrical energy to the electrical outlets 36. The emitter of the transistor Q1 is connected to ground. The base of the transistor Q1 is connected to an output lead 64 from the filtering network 32, while the collector of the transistor Q1 is connected to a junction 66 through a resistor R5. The junction 66 connects the base of a transistor Q3, the collector of a transistor Q2 and the collector of the transistor Q1. The transistors Q2 and Q3 are part of the current limiting circuit 24, a circuit feature of the power supply circuit 34.

The power supply circuit 34 includes a plug P1 (or 16) that plugs into a cigarette lighter socket 18 to place the on/off circuit 10 in electrical connection with the battery 14 of a vehicle. That is, the plug P1 is utilized to access voltage from the lighter socket 18. A fuse F1 (preferably 10 amps) is interposed in the lead 60 from the plug P1. The electrical noise filter 38 is comprised of two capacitors C5 and C6 which are used to filter any electrical noise present in the electrical system of the automobile (or other vehicle). The capacitors C5 and C6 are connected in parallel to the lead 68, and are also connected to ground. The plug P1 is connected to the current limiting circuit 24 via the leads 60 and 68.

The current limiting circuit is comprised of the transistors Q2 and Q3 and the resistors R5 and R6. A junction 70 connects the lead 68, resistor R6, a manual switch SW1 and the emitter of the transistor Q2. A junction 72 connects the resistor R6, the base of the transistor Q2 and the emitter of the transistor Q3. A junction 74 connects the manual switch SW1, the collector of the transistor Q3 and the electrical outlets 36 (comprising sockets S1, S2, S3, S4). Q3 is a Darlington transistor which has a very high current gain. The current limiting circuit 24, in the preferred embodiment, will limit the current not to exceed 7 amps.

In use, when the transistor Q1 is fully turned on due to the vibration detected by the sensor 22 (transducer Y1), current will flow from the battery 14, through the plug P1 and leads 60 and 68, through the resistor R6, from the emitter of the transistor Q3 through its base, through the resistor R5, and finally through the transistor Q1 to ground; this bias current will turn on the transistor Q3, thus providing a power supply to the electrical outlets, or sockets, S1, S2, S3, and S4. On the other hand, if no vibrations are detected by the sensor 22, the transistor Q1 will remain off (because it will receive no activation signal from the transducer Y1), no bias current will flow in the base circuit of Q3, and the transistor Q3 will be "off", thus ensuring that no voltage is provided to the electrical outlets 36. If the current provided to the sockets S1–S4 (i.e. outlets 36) approaches about 7 amps, the current limiting circuit 24 will function to limit current as follows. The voltage drop across the resistor R6 reaches about 0.7 V as the current approaches approximately 7 amps; this voltage will turn on the transistor Q2 and current will then flow through the transistor Q2, the resistor R5, and the transistor Q1 to ground. Thus, the transistor Q2 shunts current to ground, which will reduce the bias current for the transistor Q3, thereby reducing the current that passes through the transistor Q3 along a path from Q3 emitter to Q3 collector, and ultimately to the electrical outlets 36. The current limiting circuit 24 serves to reduce current, thereby avoiding heat damage caused by high current.

A manually actuated bypass switch 26 (i.e. SW1) is electrically connected between the electrical outlets 36 and the plug P1. If SW1 is open, the automatic on/off circuit 10 works as normal. When SW1 is closed, the automatic on/off circuit 10 is bypassed and power is supplied to the electrical outlets 36 whether the engine 39 is on or off (i.e. whether mechanical vibrations are present or absent).

The electrical components appearing in an exemplary embodiment of the on/off circuit shown in FIG. 2, can have the values listed in the following table:

| Component | Identifying Data |
|---|---|
| C1 | Capacitor, TANT, 47 UF, 25 V |
| C2 | Capacitor, TANT, 100 UF, 25 V |
| C3 | Capacitor, TANT, 100 UF, 25 V |
| C4 | Capacitor, TANT, 100 UF, 25 V |
| C5 | Capacitor, TANT, 100 UF, 25 V |
| C6 | Capacitor, Film, 0.1 UF, 25 V |
| D1 | Diode, 1N34 |
| D2 | Diode, 1N4007 |
| D3 | Diode, 1N4007 |
| F1 | Fuse, 10 AMP |
| P1 | Plug |
| Q1 | Transistor, 2N3904 |

| Component | Identifying Data |
|---|---|
| Q2 | Transistor, 2N3906 |
| Q3 | Transistor, 2N6053 |
| R1 | Resistor, 100K, ¼ W, 10% |
| R2 | Resistor, 100 OHM, ¼ W, 10% |
| R3 | Resistor, 10M, ¼ W, 10% |
| R4 | Resistor, 20K, ¼ W, 10% |
| R5 | Resistor, 2.7K, ¼ W, 10% |
| R6 | Resistor, 0.1 OHM, 10 W, 10% |
| S1 | Electric Socket |
| S2 | Electric Socket |
| S3 | Electric Socket |
| S4 | Electric Socket |
| SW1 | Switch, SPST |
| U1 | IC, LM358 |
| Y1 | Piezoelectrical Transducer |

The preferred piezoelectrical transducer Y1 is of the type sold Radio Shack, catalog #273-073.

The on/off circuit 10 of the present invention can be incorporated into any electrical adapter, or can be built into a stand alone unit providing one or more electrical sockets for powering electrical accessories. The stand alone unit has not been illustrated because, as will be apparent to those skilled in the art, its exterior appearance and design can be done in any of a variety of appealing configurations. The circuit components of the on/off circuit 10 are energized by the twelve volt battery of the automobile, via electrical connection therewith through the plug 16 inserted in the cigarette lighter socket 18. As noted previously, the on/off circuit 10 may also be employed in boats, planes and other engine powered vehicles.

From the foregoing, it will be appreciated that the on/off circuit 10 senses mechanical vibration to determine whether or not the motor of the vehicle is running and upon noting an absence of mechanical vibrations (thus indicating that the motor is off), shuts off power to the electrical outlets 36 so that no electrical accessories 12 will be able to drain the vehicle's battery power while the motor is off. The automatic on/off circuit 10 advantageously only supplies power to the electrical accessories (such as a radar warning device) while the automobile engine is running.

While a particular form of the invention has been illustrated and described, it will be apparent that various modifications can be made without departing from the spirit and scope of the invention. Accordingly, it is not intended that the invention be limited, except as by the appended claims.

I claim:

1. In combination with a motor vehicle having an electric system including a battery, an on/off circuit for automatic control of the power supply provided to electrical accessories from the battery of the vehicle, said circuit comprising:

sensor means for detecting mechanical vibrations present during operation of the motor of said vehicle, said sensor means including means for outputting an alternating current electrical signal upon detection of said vibrations;

operational amplifier (op-amp) means, said op-amp means being electrically interconnected with said sensor means for receiving input therefrom, wherein said op-amp means amplifies the electrical signal outputted by the sensor means whenever mechanical vibrations are detected by said sensor means;

means for protecting the op-amp means by preventing voltage at an input pin of the op-amp means from falling below a predetermined minimum voltage level;

a voltage doubling rectifier to rectify an amplified alternating current electrical signal outputted by said op-amp means, said rectifier being electrically connected within said on/off circuit so as to receive input from said op-amp means;

first filter means for filtering the AC component of the rectified current signal outputted by said rectifier into a direct current signal, said first filtering means being electrically connected within the on/off circuit so as to receive input from said rectifier;

first transistor means for activating a power supply circuit in response to a direct current signal from said first filtering means, said first transistor means being electrically connected with, and responsive to, said sensor means via an electrical pathway that includes said op-amp means, said rectifier and said first filtering means; and a power supply circuit including:

means for electrically connecting the power supply circuit to the battery of the vehicle;

at least one electrical outlet adapted to place an electrical accessory operatively associated therewith in electrical connection with the battery via said power supply circuit;

a current limiting circuit that limits current flow to said electrical outlet to a preselected maximum, said current limiting circuit including:

second transistor means for activating said electrical outlet in response to reception of a current flow from said first transistor means, said second transistor means being electrically interconnected with said first transistor means; and third transistor means that is in electrical communication with means for grounding the current limiting circuit, said third transistor means being electrically connected between said battery and said second transistor means such that a current flow approaching said preselected maximum will activate said third transistor means, thereby creating a current flow path through said third transistor means to the grounding means in a manner that reduces the current flow to said second transistor means and said electrical outlet;

wherein said on/off circuit functions to supply power to the at least one electrical outlet whenever the sensor means is detecting mechanical vibrations emanating from a running motor and functions to automatically discontinue the supply of power to the at least one outlet whenever mechanical vibrations are no longer detected by the sensor means.

2. The invention as set forth in claim 1 further including second filtering means for filtering electrical noise from the electrical system of a motor vehicle to the on/off circuit.

* * * * *